April 14, 1936. H. A. FLOGAUS 2,037,464
MOTOR VEHICLE DRIVING MECHANISM
Filed June 21, 1934
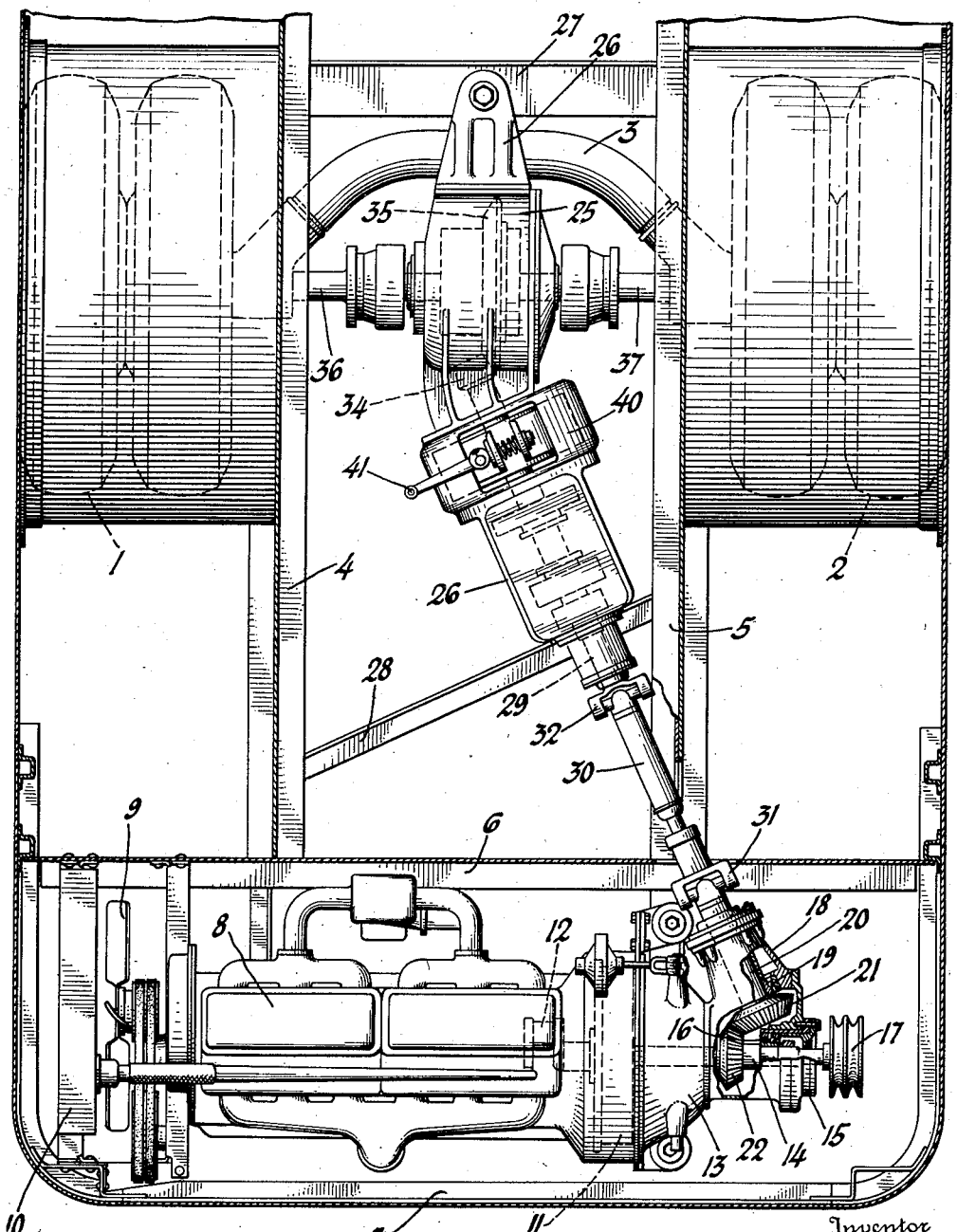
Inventor
Howard A. Flogaus
By Blackmore, Spencer & Flint
Attorneys Patented Apr. 14, 1936

2,037,464

UNITED STATES PATENT OFFICE 2,037,464

MOTOR VEHICLE DRIVING MECHANISM

Howard A. Flogaus, Ferndale, Mich., assignor to General Motors Truck Corporation, Pontiac, Mich., a corporation of Delaware Application June 21, 1934, Serial No. 731,669

4 Claims. (Cl. 180—70)

This invention has to do with motor vehicles and more particularly to a relatively compact arrangement of the large and bulky drive elements required for heavy duty use as in the case of passenger coaches.

For the satisfactory operation of large buses an enormous power plant is required, and according to practices heretofore generally followed, a considerable amount of space is occupied by the propelling mechanism. Recently attempts have been made to increase pay load space by locating the engine under the passenger seats and beneath the floor at either the side or the rear of the vehicle. In a few instances the power plant unit, including engine, clutch and variable speed mechanism, is located beyond the driving axle and transversely of the vehicle beneath a long seat backing against the rear wall of the body, and it is to this type of construction that the present invention relates.

For practical reasons, and especially in the matter of passing other vehicles on the road, the width of a motor coach, however long, cannot exceed a given maximum, and this limits the overall size of a unit power plant of conventional design positioned crosswise of the vehicle. For heavy duty use the length of an engine, clutch and transmission assembly required for a power output sufficient for satisfactory operation is greater than the permissible maximum vehicle width. With this in mind, it is here proposed to arrange the driving elements, all of which are mainly of standard and proven design, in a more compact grouping better suited to the space available. Accordingly, the engine and clutch as a unit are mounted transversely of the vehicle with the cylinder block of the engine, which is both long and high, projecting above the body floor line and being accommodated under the passenger seat or the like along the rear wall of the vehicle body and the variable speed mechanism is joined as a unit with the axle differential beneath the floor and is driven by a universally jointed propeller shaft extending thereto diagonally of the vehicle center line from the output side of the transversely disposed power generating unit.

The improved construction will be understood best by reference to the accompanying drawing, illustrating a preferred embodiment and in which the figure is a plan view of the rear portion of the coach body framing and the propelling mechanism associated therewith.

Referring to the drawing, the numerals 1—2 indicate a pair of transversely spaced dual wheels mounted for rotation upon a forwardly bowed dead axle 3 which supports, through suitable springs, the chassis frame which may be so constructed as to form an integral part of the body structure. When so constructed the body framing includes a pair of longitudinally extending main frame members 4 and 5, preferably of channel shape, to which are secured at spaced intervals a number of transverse framing elements supporting vertical posts or pillars in the side walls and roof, as will be readily understood.

The two transverse frame members 6 and 7 at the rear of the vehicle provide for the mounting therebetween of the vehicle power plant which in the present case includes an internal combustion cylinder-in-line engine 8 driving at one end a fan 9 for inducing flow of air through the engine cooling radiator 10 and having at its opposite end a clutch and flywheel 11 associated with the engine crank shaft 12 and enclosed within a housing 13 rigid with the engine crank case. The clutch shaft 14 extends through and beyond a gear housing 15 having a bearing at 16 in the outer wall of the housing 15 and carrying a pulley 17 or the like exteriorly of the unit for driving various accessories, such as an air compressor or an electric current generator. Extending forwardly from the housing 15 at an acute angle to the power shaft is an extension 18 providing a bearing 19 for the shaft 20 of the bevelled gear 21, which meshes with and is driven by a bevelled gear 22 keyed or splined on the clutch or power output shaft 14.

Between the power unit and the driving wheels 1 and 2 is located a differential and a variable speed mechanism joined as a unit and preferably supported upon the body framework. This unitary assembly is enclosed within angularly disposed housings 25 and 26 with the differential housing 25 located substantially on the vehicle center line and having a forward extension 26 by which one end of the unit is supported on a transverse frame member 27, while the rearward end of the unit is supported upon a diagonally disposed framing element 28 at the rear of the transmission housing 26. The change speed mechanism, which may be of any approved type, has its input shaft 29 extending at an acute lateral angle in line with the drive shaft section 20, and the two shafts are connected by a splined sectioned propeller or drive shaft 30 connected at one end through a universal joint 31 with the shaft 20, and at its opposite end through a universal joint 32 with the transmission shaft 29. The universally jointed and splined sectioned propeller shaft provides for slight misalinement and body frame distortion.

The output shaft of the variable speed mechanism carries a bevelled gear 34 engaging the ring gear 35 of the rear axle differential for driving the road wheels through universally jointed axle shafts 36 and 37. If desired, an additional casing member 40 can be interposed between the angularly disposed housings 25 and 26 for supporting suitable brake mechanism including a contracting friction band which acts upon a drum carried by the transmission output shaft. An operating lever 41 is indicated in the drawing for applying the brake mechanism. In this connection it may be pointed out that the brake, transmission, clutch and other control mechanisms may be actuated from the remote position of the operator at the forward end of the vehicle, either by long levers directly, or through suitable electrical, hydraulic or air devices, or any combination thereof.

From the above description it will be apparent that there is provided a compact arrangement for conveniently grouping in close coupled relation the necessary drive elements of a motor vehicle and which is especially useful where the elements are necessarily of large size for heavy duty work.

I claim:

1. In a motor vehicle, a body, a pair of transversely spaced driving wheels located forward of the rear end of the body, transverse drive axles for said wheels, a power transmitting unit associated with the axles and including in longitudinal succession differential mechanism connecting the drive axles, brake mechanism and change speed means diagonally disposed with reference to the axles, a power plant unit including an engine and a clutch disposed transversely at the rear end of the body and being so constructed and arranged as to occupy substantially the entire width of the body and a universally jointed propeller shaft extending diagonally of the power plant in line with the change speed means of said power transmitting unit and operably connecting the change speed means with the clutch end of the power plant unit.

2. In a motor vehicle end construction, a transversely disposed power plant occupying substantially the entire width of the vehicle and including an engine, a clutch, and a gear box arranged in transverse succession, a power transmitting unit including in longitudinal succession a centrally disposed differential and a diagonally related change speed mechanism, a diagonally disposed drive shaft connecting said change speed mechanism and the clutch through said gear box and accessory drive means beyond the gear box operatively connected with the clutch.

3. In a motor vehicle, a supporting structure, a transversely disposed engine and clutch unit mounted on said structure, a differential drive and variable speed unit including angularly related housings enclosing the differential and variable speed mechanisms respectively, means mounting opposite ends of the latter unit on the supporting structure, and a universally jointed drive shaft extending diagonally of the engine in line with the variable speed housing and coupling said clutch and variable speed mechanism.

4. A motor vehicle having a frame supporting side and end walls, a pair of transversely spaced drive wheels located inwardly of the side walls and spaced longitudinally from said end wall, a power plant, including an engine, a clutch and a gear box arranged in transverse succession behind the wheels and adjacent said end wall, said clutch having an output shaft extending through and beyond said gear box and carrying accessory drive means thereon, a propeller shaft having a drive connection located within said box and connected with said clutch output shaft, a variable speed unit and a differential unit arranged in longitudinal succession and fixedly mounted on the frame, said variable speed unit having an input shaft joined to said propeller shaft and an output shaft drive connected with the differential unit, a brake associated with the output shaft, universally jointed axle shafts extending outwardly from the differential to said wheels, and a dead axle on which the wheels are mounted.

HOWARD A. FLOGAUS.